July 1, 1924.
A. C. ASPER
1,500,043
AUTOMOBILE STARTING DEVICE
Filed April 24, 1923
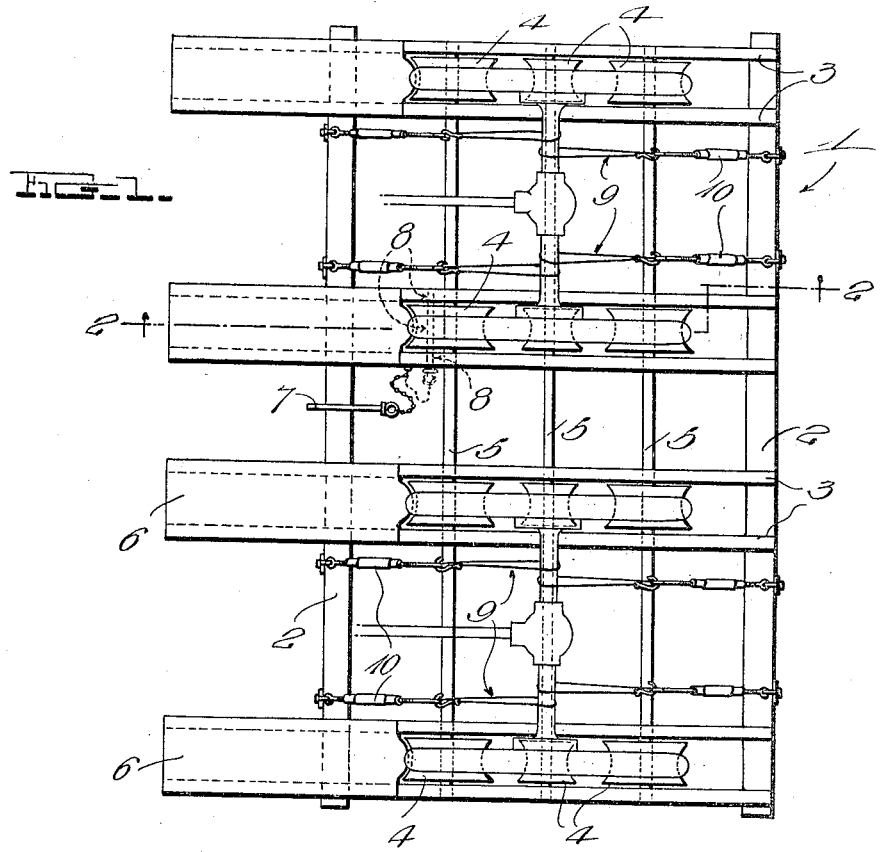
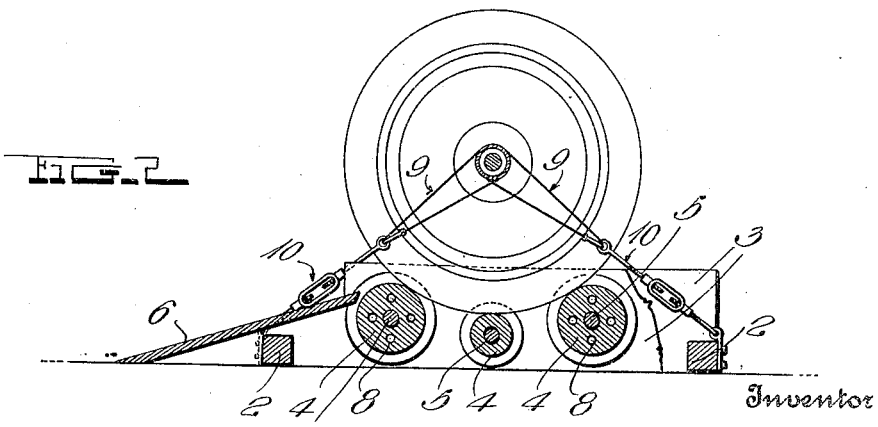
Inventor
A. C. Asper Patented July 1, 1924.

1,500,043

UNITED STATES PATENT OFFICE.

ALBERT C. ASPER, OF KANSAS CITY, MISSOURI.

AUTOMOBILE STARTING DEVICE.

Application filed April 24, 1923. Serial No. 634,385.

*To all whom it may concern:*

Be it known that I, ALBERT C. ASPER, a citizen of the United States, residing at Kansas City, in the county of Wyandotte and State of Missouri, have invented certain new and useful Improvements in Automobile Starting Devices; and I do declare the following to be a full, clear, and exact description of the invention, such as will enable others skilled in the art to which it appertains to make and use the same.

In the great majority of automobile repair shops, there is no provision made for starting the motors of automobiles after tightening the bearings thereof, it being common practice to tow a machine with a "stiff" motor for the purpose of starting the same. It is the object of my invention however to provide a simple and inexpensive device to be used at any desired place in a repair shop or in a storage room if desired, which will permit the use of an automobile running under its own power for starting another automobile, without the necessity of towing.

With the foregoing in view, the invention resides in the novel subject matter hereinafter described and claimed, the description being supplemented by the accompanying drawing.

Figure 1 is a top plan view of an automobile starting device constructed in accordance with my invention.

Figure 2 is a vertical sectional view as indicated by line 2—2 of Fig. 1.

In the drawing above briefly described, the numeral 1 designates an elongated base frame which is of a length substantially equal to the combined width of two automobiles. This frame preferably consists of two parallel base bars 2 extending throughout the length of the frame, and four pairs of parallel sills 3 secured at their ends to said base bars. In the form of construction shown, a plurality of peripherally grooved wheels 4 are received between the sills of each pair and these wheels are secured upon a plurality of shafts 5 which extend substantially throughout the length of the base frame 1. It is essential when the general construction herein disclosed is employed, that at least one of the shafts 5 shall extend throughout the length of the frame 1 and that all of the wheels 4 carried by this particular shaft, shall be secured upon said shaft. The other wheels might well be mounted on short shafts if desired, but I prefer that all of them shall be of uniform length and that the wheels shall all be secured upon their respective shafts.

Suitable runways 6 are provided so that an automobile to be started may be backed upon one set of the wheels 4 while another machine operating under its own power, may be backed onto the other set of rollers. Thus the power from the last mentioned machine will be utilized to drive the rear wheels of the other machine and when the latter is thrown into gear, its motor will be driven. If desired, as soon as the machine is operating properly under its own power, the machine which was used to start it, may be removed and another "stiff" machine backed onto the device in its place to be started by the power of the previously started machine.

The relation of parts is such that the two machines will be in close proximity to each other, permitting a mechanic making adjustments, for instance on the carbureter on the machine being started, to easily give necessary directions to the driver of the other machine, particularly with regard to the speed at which his motor is being driven.

For the purpose of holding certain of the wheels 4 against rotation when running a car onto or off of the rollers under its own power, I may provide any suitable means, such as a pin 7 insertible through openings 8 in certain of the rollers and the adjacent sills 3.

Any desired means may be employed for holding both machines upon the starting device, but for this purpose, axle-engaging chains 9 and turn-buckles 10 are preferably employed.

By the construction shown and described or a substantial equivalent thereof, it will be seen that a simple and efficient shop device has been provided which will readily permit the use of one machine for starting another which is too stiff to crank by hand or to start by means of the usual self-starter, overcoming the necessity of towing for starting purposes, which is not only troublesome, but often seriously strains the leading machine.

As excellent results may be obtained from the details disclosed, they are preferably followed, but within the scope of the invention as claimed, numerous minor changes may be made.

I claim:

1. A starting device for stiff automobile motors comprising a support for the rear end of an automobile to be started, said support having a member to engage and rotate the rear wheels of the machine; a second support for the rear end of a second automobile operating under its own power, said second support having a member to engage and be driven by the rear wheels of said second automobile, and positive driving means connecting the first and second named wheel-engaging members to drive one by means of the other.

2. A structure as specified in claim 1; the two supports being in close proximity to each other.

3. A starting device for stiff automobile motors, comprising a base of a length substantially equal to the combined width of two automobiles, a shaft extending substantially throughout the length of the base, two pairs of wheels secured on said shaft to contact with the rear wheels of two automobiles, permitting the power of one machine to be used for starting the other, and additional wheels mounted on said base and co-operating with the wheels of said shaft for supporting the rear automobile wheels.

In testimony whereof I have hereunto affixed my signature.

ALBERT C. ASPER.